Jan. 20, 1959  R. ADELL  2,869,921
ORNAMENTAL AND PROTECTIVE MOLDING FOR EDGES OF AUTOMOBILE DOORS
Filed June 6, 1956

INVENTOR.
ROBERT ADELL
BY
ATTORNEY.

:::::::::::::::::::::::::::::::::::::::::::::::::::::::::::::::::::::

United States Patent Office 2,869,921
Patented Jan. 20, 1959

2,869,921

ORNAMENTAL AND PROTECTIVE MOLDING FOR EDGES OF AUTOMOBILE DOORS

Robert Adell, Detroit, Mich., assignor to Franklin Z. Adell and Marvin M. Adell, both of Detroit, Mich.

Application June 6, 1956, Serial No. 589,822

2 Claims. (Cl. 296—44)

This invention relates to motor vehicles and more particularly to improved bodies thereof in which edges of various movable closures, such as doors, are provided with ornamental and protective moldings.

Those skilled in the art have now fully appreciated the advantages of providing ornamental and edge protective moldings for the edges of such closures, as disclosed in my issued patents and pending patent applications. However, it has been found that provision of such moldings presents a number of very difficult problems.

Particularly, it has been appreciated that one of the most difficult problems confronted by those skilled in the art is provision of practical means for retaining the molding on its edge under various operation conditions, such as in hard slamming of the doors, as well as in closing doors provided with edge protective moldings and having insufficient clearance between the door edge and the door post, under which conditions the molding tends to slip off the edge.

One of the objects of the present invention is to provide improved ornamental and edge protective molding for automobile closures such as doors, including improved means for retaining the molding in place.

Another object of the present invention is to provide molding of the nature specified in the preceding paragraph, which can be applied in an easy and simple manner, with the improved retaining means retaining the molding on the door edge in a positive manner, and yet providing greater latitude of adjustments in installation of such moldings to take care of manufacturing variations in automobile doors.

A still further object of the present invention is to provide an improved edge protective molding for automobile doors which is simple and rugged in construction, dependable in use and is relatively inexpensive to manufacture and to install.

Further objects and advantages of this invention will be apparent from the following description and appended claims, reference being had to the accompanying drawings forming a part on this specification, wherein like reference characters designate corresponding parts in the several views.

Figure 1:
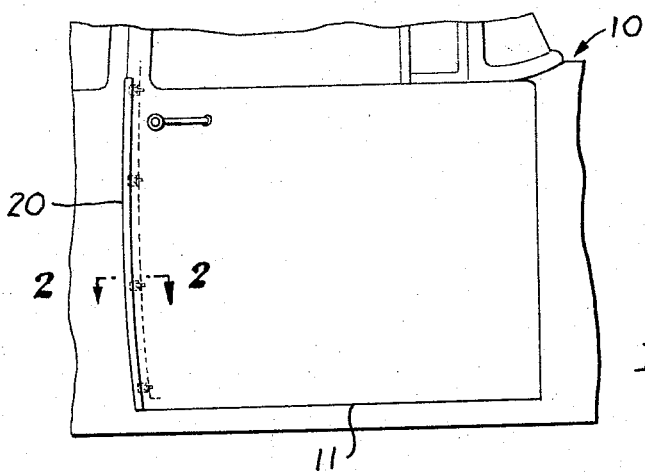
Fig. 1 is a fragmentary side view of an automobile having doors provided with an improved ornamental and edge protective molding embodying the present invention.
Figure 2:
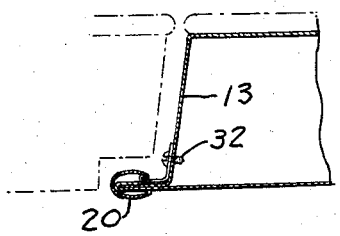
Fig. 2 is a sectional view taken in the direction of the arrows on the section plane passing through the line 2—2 of Fig. 1.
Figure 3:
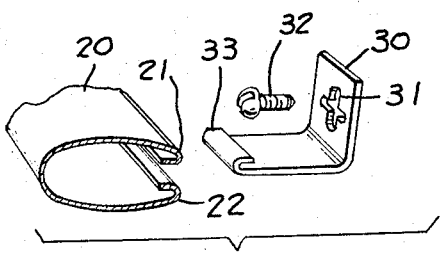
Fig. 3 is an exploded view illustrating the molding strip, a retaining bracket therefor and a self-tapping screw for securing the retaining bracket to the door structure.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention, I provide a molding in which the molding strip has a substantially U-shaped cross section with the edges of the molding being bent upon themselves to provide curls. The curl, at least on the inner leg of the U, i. e. the leg disposed inside of the door trailing edge, is open and forms, in effect, a hook edge. A plurality of retaining brackets is connected to the door structure on the inner side thereof. A corresponding plurality of holes may be provided on the door in making the same and painted over to close such holes but to leave indentations indicating location of such holes. The retaining brackets are connected to the door structure at such holes with the aid of self-tapping screws. The free end of each retaining bracket has a hook or an open curl provided thereon and is adapted to engage the hook edge of the molding strip. Thus, when the molding is installed with its hook edge engaging the hook of the retaining bracket which is positively secured to the door structure, the molding strip is retained on the door edge positively, and the possibility of its coming off is eliminated. Yet, since the molding is not rigidly secured to its retaining bracket, a much greater degree of adjustment is made possible to take care of unavoidable manufacturing variations than was heretofore possible.

Referring specifically to the drawings, there is shown therein an automobile having a door with a curvilinear trailing edge provided with ornamental and edge protective molding embodying the present invention. The automobile is generally designated by the numeral 10 and is shown in fragmentary side elevation to illustrate the front door thereof designated generally by the numeral 11.

The molding comprises generally a strip 20 having a substantially U-shaped or oval cross section, with the edges of the strip at the ends of the legs of its U-shaped cross section being bent upon themselves as indicated at 21 and 22 to form curls. The curl, at least on the inner leg of the U, i. e. curl 21, forms a hook edge. The strip 20 is preferably made of sheet metal and has a polished outer surface.

The retaining brackets 30, a plurality of which are provided on the door structure along the trailing edge thereof, comprise a strip of sheet metal bent at an angle corresponding to the inner angle formed on the inside of the door. An opening 31 of a cross shape is provided on the bracket to receive a self-tapping screw 32. Provision of the cross shape opening enables an adjustment of the bracket for a considerable distance in two perpendicular directions, which is an advantage considering usual manufacturing variations in automobile doors and particularly in location of the pre-punched holes therein.

The free end of the bracket is bent upon itself as indicated at 33 to provide an open curl or hook adapted to engage the curl 21 of the molding strip 20.

Figure 4:
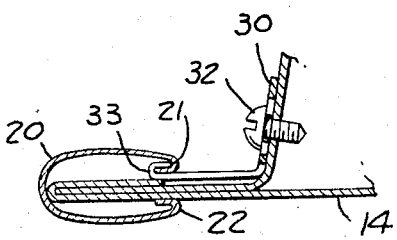
Fig. 4 is a sectional view showing on an enlarged scale the portion of Fig. 2, including the door structure at the trailing edge thereof, the molding strip and the retaining bracket thereof.

Fig. 4 shows the molding assembled to a door edge. As can be seen from an examination of Fig. 4, the bracket 30 is connected with the aid of the screw 32 to the inner sheet 13 of the door, fitting into the internal angle formed in said sheet. The open curl 33 of the bracket 30 engages the curl 21 of the molding strip 20, while the outer portion of the molding strip envelops the trailing edge on the outer surface thereof, with the curl 22 preferably bearing on the outer or cover sheet 14.

It will now be seen that any pull exerted on the molding strip 20 will be resisted by the retaining bracket 30 to the full strength thereof, and coming off of the molding is unlikely.

While the present invention has been herein disclosed with reference to automobile doors, it will be understood that it is applicable to other automobile body closures, such as trunk lids, engine hoods, and the like. It will also be understood that while the present invention has been illustrated and described with reference to an ornamental and protective molding applied only to the lower portion of the trailing edge of the door, it is not limited to applications to only such portion and may be provided along the entire free edges of the doors.

By virtue of the above disclosed construction, the objects of the present invention and numerous additional advantages are attained.

I claim:

1. In an automobile having a door with a trailing edge and a flange extending transversely of the door on the inner side thereof along said edge, an ornamental and protective molding for at least a portion of said edge, said molding comprising a strip of sheet metal having substantially U-shaped cross-section arranged on the door edge with the center line of the U being parallel to the plane of the door edge with the edges of the strip being bent upon themselves, with the bent edge at least on the inner edge of the molding on the inner side of the door being open to form a hook, a plurality of retaining brackets provided on the inside of the door along said peripheral edge but outside of the molding, each of said brackets having one end secured to the transversely extending flange of the door structure and the other end having a hook provided thereon, said hook reaching inside of the molding and engaging its hook edge for resisting outward movement of said molding and for providing adjustment of position of the molding on the door edge.

2. The invention defined in claim 1, said brackets being of angular construction, with the end thereof secured to the transversely extending flange being provided with a cross-shaped hole adapted to receive a self-tapping screw engaging said flange for securing said end thereto and to provide for adjustment of the bracket with respect to the flange.

References Cited in the file of this patent

UNITED STATES PATENTS

| | | |
|---|---|---|
| 2,148,847 | Wiley | Feb. 28, 1939 |
| 2,150,476 | Woodall | Mar. 14, 1939 |
| 2,536,895 | West | Jan. 2, 1951 |
| 2,685,472 | Adell | Aug. 3, 1954 |
| 2,704,687 | Adell | Mar. 22, 1955 |